US005736186A

United States Patent [19]
Holdren et al.

[11] Patent Number: 5,736,186
[45] Date of Patent: Apr. 7, 1998

[54] PROCESS FOR PRODUCING DRY AND SEMI-DRY SAUSAGE PRODUCTS

[75] Inventors: William C. Holdren; Don E. Alden, both of Hutchinson, Kans.

[73] Assignee: Doskocil Food Service Company, L.L.C., South Hutchinson, Kans.

[21] Appl. No.: 582,751

[22] Filed: Jan. 3, 1996

[51] Int. Cl.$^6$ .......................... A23L 1/314; A23L 1/317
[52] U.S. Cl. .................................. 426/646; 426/513
[58] Field of Search .............................. 426/646, 513, 426/241, 242, 520, 92, 96, 99, 650, 652, 516

[56] References Cited

U.S. PATENT DOCUMENTS

| | | | |
|---|---|---|---|
| 3,904,776 | 9/1975 | Magnino et al. | 426/513 X |
| 4,262,027 | 4/1981 | Tonner et al. | 426/325 |
| 4,279,935 | 7/1981 | Kentor | 426/264 |
| 4,362,750 | 12/1982 | Swartz | 426/59 |
| 4,492,712 | 1/1985 | Casella | 426/59 |
| 4,497,845 | 2/1985 | Percel et al. | 426/646 |
| 4,511,592 | 4/1985 | Percel et al. | 426/646 |
| 4,576,825 | 3/1986 | Tracy et al. | 426/266 |
| 4,731,006 | 3/1988 | Freda et al. | 425/190 |
| 4,772,477 | 9/1988 | Weiss et al. | 426/99 |
| 4,800,094 | 1/1989 | Freda et al. | 426/513 |
| 4,844,922 | 7/1989 | Uemura et al. | 426/104 |
| 5,160,758 | 11/1992 | Parks et al. | 426/506 |
| 5,183,683 | 2/1993 | Mott et al. | 426/641 |
| 5,639,495 | 6/1997 | Alden et al. | 426/59 |

FOREIGN PATENT DOCUMENTS

| | | | |
|---|---|---|---|
| 546429 | 9/1957 | Canada | 426/516 |
| 896958 | 4/1972 | Canada | 426/646 |
| 964106 | 3/1975 | Canada | |

OTHER PUBLICATIONS

Considine et al., Foods and Food Production Encyclopedia, pp. 1160–1199, dated 1982.

"Minimizing Cupping and Curling in Pepperoni", Meat Marketing & Technology, p. 46, dated Aug. 1993.

Egbert et al., "Development of Low-Fat Ground Beef", Food Technology, pp. 64, 66–68 and 70–72, dated Jun., 1991.

A product data sheet entitled "Durkote® Citric Acid 150–85–Encapsulated Citric Acid" of Van Den Bergh Food Ingredients Group, published in 1993.

A product data sheet entitled "Balchem Cap-Shure® C-135-72 Curing Agent-Meat" of Balchem Corporation, revised Jan. 1994.

Lucy Long et al., Food Products Formulary, vol. 1–Meats, Poultry, Fish, Shellfish, pp. 37–59, 1982, Avi Publishing Co., Inc., Westport, Connecticut.

R.E. Rust, "Sausage Products", The Science of Meat and Meat Products 3rd Ed., pp. 456–485, 1987, Food & Nutrition Press, Inc., Westport, Connecticut.

*Primary Examiner*—Arthur L. Corbin
*Attorney, Agent, or Firm*—Dougherty & Hessin, P.C.

[57] ABSTRACT

A process for producing dry and semi-dry sausage products. Ground meat is admixed with an acidulant (e.g., a food grade acid) encapsulated by a material having a melting temperature of at least about 90° F. The resulting admixture is formed into at least one shaped sausage product wherein the product has at least one cross-sectional dimension no greater than 1.0 inch. The shaped sausage product is then heated at a temperature and for a period of time sufficient to (a) melt the encapsulating material and allow the acid to contact the meat and lower the pH of product to a value no greater than 5.3 and (b) dehydrate the product such that the ratio of the weight of moisture in the product to the weight of protein in the product is no greater than 3.7 to 1. The heating step is carried out for a period of time no greater than about one hour (typically for only a few minutes) and in a heating apparatus operating at a dry bulb temperature in the range of from about 90° F. to about 500° F.

62 Claims, 2 Drawing Sheets

PROCESS FOR PRODUCING DRY AND SEMI-DRY SAUSAGE PRODUCTS

BACKGROUND OF THE INVENTION

1. Field of the Invention

This invention relates in general to dry and semi-dry sausage products, e.g., pepperoni, and more particularly, but not by way of limitation, to processes for producing dry and semi-dry sausage products.

2. Background of the Invention

Dry and semi-dry sausage products generally comprise highly seasoned mixtures of finely divided pork, beef and/or poultry that have been formed into a desired shape and cured. Examples of dry sausage products include pepperoni, dry salami and genoa. Examples of semi-dry sausage products include beef summer sausage, thuringer and sicilian salami.

Dry and semi-dry sausage products are classified by the United States Department of Agriculture ("USDA") according to process conditions, finished product pH, finished product moisture to protein ratio ("MPR") and other factors. For example, in order to meet the criteria for pepperoni, the product must have a finished product MPR of 1.6 to 1 and be processed under conditions specified by the USDA sufficient to kill trichinae. In order to meet the criteria for beef summer sausage, the product must have a finished product MPR of 3.1 to 1 and a finished product pH of no greater than 5.0.

A typical process for making dry and semi-dry sausage products includes the following steps:

(1) Admix ground meat (pork, beef and/or poultry) with spices, curing agents and acid-producing bacteria, e.g., lactic acid-producing bacteria. Additional sources of acid such as encapsulated citric acid can also be used. The exact types of meat, spices, curing agents and sources of acid employed depend upon the type of sausage product desired. Dry sausages may or may not be characterized by a bacterial fermentation.

(2) Form the meat mixture into the desired shape by stuffing the mixture into casings of prepared animal intestine or synthetic material which are tied shut at both ends to form a single cylindrical unit or at intervals to form lengths. The mixture must be formed into the appropriate shape before a significant amount of acid is produced by the bacteria, released by the encapsulating material or otherwise imparted to the admixture. The acid lowers the pH of the admixture making the meat non-pliable and difficult to shape. The meat is generally easy to work with at a pH of above 5.3.

(3) Allow the formed product to set in a fermenting chamber at a temperature and for a period of time sufficient for enough acid to be produced by the bacteria, released by the encapsulating material or otherwise imparted to the admixture to lower the pH of the admixture to a value below 5.2, typically below 5.0. The low pH level prevents further bacterial growth and otherwise makes the product biologically stable, produces an acidic flavor and sets the protein in the meat thereby giving the product a firm texture. The temperature in the fermentation chamber is typically maintained between 60° F. and 105° F. for from 7 to 14 hours.

(4) Dry the product at a temperature and for a period of time sufficient to obtain the required finished product MPR (e.g., for pepperoni, 1.6:1). For dry sausage products, the drying step must be carried out under conditions which allow slow controlled uniform removal of moisture from the product yet inhibit the growth of surface mold or yeast. For example, the drying chamber is typically maintained at a temperature between 50° F. and 70° F. and kept relatively dry to inhibit the growth of mold or yeast. It generally requires several days or even weeks to reach the required finished product MPR depending upon the thickness of the formed product and other process conditions.

Some dry sausage is smoked prior to being dried but the primary production step is a relatively long, continuous air-drying process. Dry sausage typically requires more production time than other types of sausage. Dry sausage generally ranges from about 60% to about 80% of its original weight when sold. Semi-dry sausage is usually heated in a smokehouse to fully cook and partially dry the product. Various processes for producing dry sausage products and problems associated therewith are described in U.S. Pat. No. 4,279,935 which is incorporated by reference herein.

Unfortunately, maintenance of the required conditions during the extended fermenting and drying steps can make mass production of dry and semi-dry sausage products somewhat difficult. There is a need for an economical process for making dry and semi-dry sausage products in a shorter period of time.

SUMMARY OF THE INVENTION

In accordance with the invention, an improved process for producing dry and semi-dry sausage products has been developed. The process allows dry and semi-dry sausage products to be mass produced in a matter of minutes as opposed to days or weeks. The extended fermenting and drying steps essential to the processes used heretofore have been practically eliminated. The inventive process is particularly useful for producing pepperoni. The invention also includes dry and semi-dry sausage products produced by the inventive process.

The inventive process for producing dry and semi-dry sausage products comprises the following steps:

(1) First, meat (e.g., pork, beef and/or poultry) is admixed with an acidulant to form a sausage admixture. One or more spices, curing agents, protein sources and other ingredients can also be admixed with the meat at this time. The acidulant is encapsulated by an encapsulating material having a melting temperature of at least about 90° F. such that the acidulant is prevented from substantially contacting the meat until the encapsulating material is heated to at least about 90° F. and melts. The acidulant is employed in an amount and has a strength sufficient to lower the pH of the sausage admixture to a value no greater than 5.3 when the encapsulating material melts.

(2) The sausage admixture is then formed into at least one shaped sausage product having at least one cross-sectional dimension no greater than 1.0 inch. For example, the sausage admixture can be diced, extruded and cut, or otherwise formed into a number of nuggets with each nugget having no cross-sectional dimensions greater than 0.5 inch.

(3) Next, the shaped sausage product is heated at a temperature and for a period of time sufficient to (a) melt the encapsulating material and allow the acidulant to contact the meat and lower the pH of the product to a value no greater than 5.3 and (b) dehydrate the product such that the moisture to protein ratio in the product (i.e., the ratio of the weight of moisture to the weight of protein in the product) is no greater than 3.7 to 1. The heating step is carried out for a period of time no greater than about one hour and in a heating apparatus operating at a dry bulb temperature in the range of from about 90° F. to about 500° F. for at least about 70% (preferably 100%) of the time that the heating step is carried out. For pepperoni and other products containing pork, it is important to heat the product at a temperature and for a period of time sufficient to raise the internal temperature of the product to a level high enough to assure that any harmful bacteria or trichinae is destroyed.

The inventive process does not rely on the use of acid producing bacteria. As a result, the extended fermenting step of the processes used heretofore is not required. Forming the sausage admixture into one or more shaped sausage products wherein at least one cross-sectional dimension of each product is no greater than 1.0 inch (preferably no greater than 0.5 inch) allows for efficient heat exchange and moisture transfer in the subsequent heating step. The exact heating temperature and time required in the subsequent heating step is dependent in part upon the shape (e.g., thickness) of the product. In accordance with the heating step, the acidulant (e.g., citric acid) is sufficiently released into the product to allow the acidulant to contact the meat and lower the pH of the product to the desired level (no greater than 5.3). Sufficient moisture is flashed off or otherwise evaporated from the product to achieve the required moisture to protein ratio and, if necessary, any harmful bacteria present in the product is destroyed, all in one step. For example, for pepperoni, the process can be carried out such that the heating step takes only a couple of minutes. The rapid drying achieved by the inventive process prevents further bacterial growth.

In one embodiment, the process further comprises the step of maintaining a wet bulb temperature in the heating apparatus of at least about 150° F. for at least 25% of the first half of the period of time that the heating step is carried out. This accelerates the rate at which the temperature of the product is raised to the desired level which shortens the length of the drying step. The desired wet bulb temperature is preferably regulated by adding steam to the heating apparatus.

It is, therefore, a primary object of the present invention to provide an economical process for producing dry and semi-dry sausage products in a relatively short period of time.

It is an object of the invention to provide a process for mass producing dry and semi-dry sausage products that does not include the extended fermenting and drying steps essential to the processes used heretofore.

It is also an object of the invention to provide a process for mass producing dry and semi-dry sausage products and apparatus for use in connection therewith that allow the products to be formed into nuggets and other non-conventional product shapes.

Additional objects, features and advantages of the present invention will be readily apparent to those skilled in the art upon a reading of the detailed description of the preferred embodiments of the invention which follows.

BRIEF DESCRIPTION OF THE DRAWINGS

FIG. 8A is a front view of an extrusion head useful in connection with the present invention.

FIG. 8B is an enlarged partial view of the extrusion head shown by FIG. 8A (FIG. 8B shows actual size of holes).

FIGS. 8C and 8D are front views of extrusion horns useful in connection with the present invention.

DETAILED DESCRIPTION OF THE PREFERRED EMBODIMENTS OF THE INVENTION

The invention provides an improved process for producing dry and semi-dry sausage products. The invention also provides dry and semi-dry sausage products formed in accordance with the process.

The present invention can be used to produce any type of dry and semi-dry sausage product. A product is a dry or semi-dry sausage product if it meets the criteria established for such products by the United States Department of Agriculture ("USDA"). Such criteria are set out in the *Code of Federal Regulations*, Section 318.10(c)(1)(i) (May, 1985), which is incorporated by reference herein. Generally, the product must be processed under specific time and temperature conditions and meet particular finished product criteria (e.g., pH and/or moisture to protein ratio). Examples of dry sausage products particularly suitable for production in accordance with the invention include pepperoni, dry sausage, dry salami, jerky and genoa. Examples of semi-dry sausage products particularly suitable for production in accordance with the invention include beef summer sausage, thuringer and sicilian salami.

In accordance with the inventive process, meat is first admixed with an acidulant to form a sausage admixture. The acidulant is encapsulated by an encapsulating material having a melting temperature of at least about 90° F. The encapsulating material prevents the acidulant from substantially contacting the meat until the encapsulating material is heated to at least about 90° F. and melts in the subsequent heating step. Although a small amount of the acidulant may prematurely leach from the encapsulating material over time, it is not enough to lower the pH of the meat to 5.3 or below and is therefore not significant. Once the encapsulating material melts and becomes discontinuous, the acidulant is released into the product, contacts the meat and lowers the pH to the desired level.

The type of meat used depends upon the type of dry or semi-dry sausage product desired. Examples of meats that can be used include fresh and frozen pork, beef, and/or poultry. Certain other red meats as well as soy protein products can also be included in association with particular products. The amount of fat present in the meat is also a factor. The amount of fat needed varies depending upon the type of product, flavor, etc. desired. For example, for pepperoni, meat consisting of at least about 90% by weight based on the total weight of the meat of finally divided raw meat selected from pork, beef, poultry and mixtures thereof, and having a total meat fat content no greater than about 58% by weight based on the total weight of the meat is very suitable. Fat tends to render out easily under the rapid heating conditions employed in the heating step. Excessive fat trimmings can impair the process. Accordingly, a total meat fat content of from about 20% by weight to about 45% by weight based on the total weight of the meat is most preferred. Up to 10% of pre-cooked meat (e.g., pre-cooked pepperoni) can be added to the raw meat if desired.

As used herein and in the appended claims, the term "acidulant" denotes any food grade acid as well as compounds which react with water to generate food grade acids such as glucono-δ-lactone. A food grade acid is an acid which is suitable for human consumption, United States purity grade and approved by the USDA. Examples of food grade acids that can be used include citric acid, lactic acid, acetic acid, sorbic acid, tartaric acid, isoascorbic acid, adipic acid and mixtures thereof. The acidulant used in connection with the present invention is preferably selected from the group consisting of citric acid, lactic acid, acetic acid and mixtures thereof. Most preferably, the acidulant is citric acid.

The acidulant must be used in an amount and have a strength sufficient to lower the pH of the sausage admixture to a value no greater than 5.3 when the encapsulating material melts. As used herein and in the appended claims, the pH of the meat trimmings means the pH of the meat trimmings as determined by a standard pH meter properly calibrated at the involved temperature as known to those skilled in the art. Preferably, the acidulant is used in an amount and has a strength sufficient to lower the pH of the sausage admixture to a value between 5.0 and 4.1 when the encapsulating material melts. The exact pH will vary depending in part on the type of sausage product, flavor desired, etc. For example, for pepperoni, the acidulant is preferably employed in an amount and has a strength sufficient to lower the pH of the sausage admixture to a value of 4.3. Such a low pH enhances the flavor of pepperoni.

The exact amount of the acidulant required depends in part on the initial pH of the meat, the desired pH of the meat, the buffering capacity of the meat, the type and amount of additives admixed with the meat and the strength of the specific acidulant used. Generally, the amount of acidulant that must be employed is in the range of from about 0.3% by weight to about 3.0% by weight based on the weight of the meat. For example, in order for citric acid to lower the pH of the sausage admixture (or shaped sausage product) to a value no greater than 5.1, in the range of from about 0.5% by weight to about 1.0% by weight of the acidulant, based on the weight of the meat, must be released by the encapsulating material during the heating step. The acidulant is preferably employed in the sausage admixture in an amount in the range of from about 0.6% by weight to about 1.1% by weight, most preferably about 1.0% by weight, based on the weight of the meat.

Encapsulating the acidulant with an encapsulating material allows the sausage admixture to be easily formed into the desired shape. The acidulant makes the meat non-pliable and difficult to form if prematurely admixed with the meat. Prior to release of the acid, the meat is typically soft and pliable.

The encapsulating material must be edible (suitable for human consumption) and of a consistency sufficient to prevent the acidulant from substantially contacting the meat (to prevent a significant amount of the acidulant from leaching to the meat) until it melts. Suitable encapsulating materials include various fats, proteins, and gums. The encapsulating material is preferably selected from the group consisting of hydrogenated vegetable oils such as partially hydrogenated soybean oil and partially hydrogenated palm oil, edible petroleum wax, tallow, edible vegetable wax and hydrogenated lards. Most preferably, the encapsulating material is a hydrogenated vegetable oil.

The encapsulating material must have a melting temperature of at least about 90° F. The exact melting temperature required depends on the temperature employed in the heating step. The encapsulating material preferably has a melting temperature in the range of from about 90° F. to about 190° F., more preferably from about 90° F. to about 158° F. The encapsulating material most preferably has a melting temperature in the range of from about 110° F. to about 158° F. For example, a very suitable encapsulating material is a hydrogenated vegetable oil having a melting temperature of approximately 154° F.

The method by which the acidulant is encapsulated with the encapsulating material is not critical as long as a uniform coating is achieved. Suitable methods for encapsulating the acidulant with the encapsulating material are known to those skilled in the art. For example, particles of the acidulant can be spray chilled with the encapsulating material. In another technique, particles of the acidulant are blended with the encapsulating material and the resulting blend is solidified and ground. Various encapsulating materials and/or encapsulating procedures are described in U.S. Pat. Nos. 4,576, 825 and 4,772,477 which are incorporated by reference herein.

The encapsulated acidulant must be used in an amount sufficient to impart the desired amount of acidulant to the meat during the heating step. The acidulant generally comprises from about 20% to about 90%, typically from about 50% to about 90%, of the total weight of the encapsulated acidulant. When the acidulant comprises at least about 85% by weight of the total weight of the encapsulated acidulant, the encapsulated acidulant is generally employed in the sausage admixture in an amount in the range of from about 0.35% to about 3.5% by weight based on the weight of the meat. For example, in order for citric acid encapsulated by a partially hydrogenated vegetable oil (wherein the citric comprises about 85% of the total weight of the encapsulated acidulant) to lower the pH of the meat to a value no greater than 5.1 during the heating step, the encapsulated acidulant is employed in an amount in the range of from about 0.9% by weight to about 1.1% by weight, based on the weight of the meat. A preferred encapsulated acidulant consists essentially of citric acid encapsulated by a hydrogenated vegetable oil (e.g., a partially hydrogenated soybean oil) wherein the citric acid comprises about 85% of the total weight of the encapsulated acidulant. Such an encapsulated acidulant is preferably employed in the sausage admixture in an amount of about 1.1% by weight based on the weight of the meat.

Examples of commercially available encapsulated acidulants very suitable for use in accordance with the invention include encapsulated citric acid sold under the trade designation "DURKOTE® CITRIC ACID 150-85" by Van Den Bergh, Food Ingredients Group (citric acid encapsulated with partially-hydrogenated soybean oil—melting point 152°–158° F.) and encapsulated citric acid sold under the trade designation "CAP-SHURE® C-135-72" by Balchem Corporation (citric acid encapsulated with partially hydrogenated palm oil—melting point 136°–144° F.).

One or more spices and one or more curing agents are preferably employed in the sausage admixture. These ingredients are preferably admixed with the meat at the general time the encapsulated acidulant is admixed with the meat. The particular spice(s) and/or curing agent(s) employed depend on the end product desired. Examples of spices that can be used include fennel, red pepper, oregano, black pepper and mixtures thereof. Examples of curing agents that can be used include sodium nitrite, sodium erythorbate, potassium nitrite, potassium nitrate, sodium nitrate and mixtures thereof. The spices are generally employed in a total amount of from about 3% to about 6% by weight based on the weight of the meat. The amount of the curing agents used varies depending on the particular agent(s). For example, sodium nitrite and potassium nitrite are each used in an amount of 0.25 ounces per 100 pounds of meat. Sodium nitrate and potassium nitrate are each used in an amount of 2.75 ounces per 100 pounds of meat. The curing agents function to retain the red meat color and kill trichinae.

In order to reduce the time required to dehydrate the product such that the moisture to protein ratio is reduced to the desired level, a dry protein source is preferably also admixed with the meat. It is important for the protein source to be dry in order to prevent additional moisture from being added to the sausage admixture. The dry protein source is admixed with the meat prior to forming the sausage admixture into one or more shaped sausage products, preferably at the general time the encapsulated acidulant, spice(s) and curing agent(s) are admixed with the meat. The dry protein source is preferably selected from the group consisting of milk protein, vegetable proteins including soy protein, corn protein, sunflower protein and wheat protein, meat proteins including beef protein and pork protein, and mixtures thereof. A preferred protein source is beef stock. The protein source is generally employed in an amount of about 0.5% by weight to about 10% by weight, most preferably about 5% by weight, based on the weight of the meat.

Additional ingredients including binders and extenders can be admixed with the meat as known to those skilled in the art of sausage making. Such additional ingredients are preferably added to the sausage admixture at the general time the encapsulated acidulant, spices, curing agents and/or protein source are admixed with the meat.

The encapsulated acidulant, spice(s), curing agent(s), protein source and any other ingredients employed can be admixed with the meat by any method that uniformly distributes the ingredients throughout the meat. Preferably, the encapsulated acidulant and other ingredients are admixed with the meat using a conventional meat blender. Generally, 2 to 5 minutes mixing time is sufficient. The meat is preferably chopped, ground or otherwise finely divided, most preferably ground, prior to admixing the encapsulated acidulant and other ingredients therewith. A very suitable sausage admixture can be obtained by grinding the meat, blending the ground meat with the encapsulated acidulant and other ingredients to form the sausage admixture and then grinding the entire sausage admixture prior to the forming step.

A general formulation for use in the inventive process to produce pepperoni is as follows:

| Pepperoni Formulation | |
|---|---|
| Meat | |
| raw beef[1] | 65.71%[2] |
| raw pork[1] | 28.16%[2] |
| Spices | |
| fennel, red pepper and oregano | 2.07%[2] |
| Curing Agents | |
| salt and sodium nitrite | 3.13%[2] |
| Encapsulated Acid | |
| citric acid encapsulated with hydrogenated vegetable oil | 0.93% |

[1]The beef and pork have a combined fat content no greater than about 50% by weight based on the total weight of the meat.
[2]The percent by weight of the component(s) based on the total weight of the formulation.

A dry protein source such as beef stock is preferably also included in the above formulation in an amount of about 5% by weight based on the weight of the meat.

Figure 1:
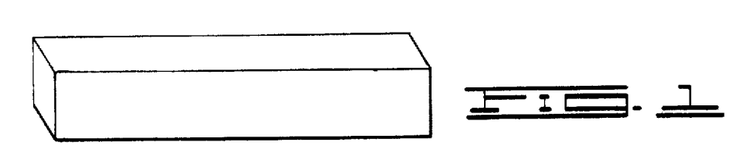
FIG. 1 is an enlarged perspective view (double scale) illustrating the shape of another sausage product formed in accordance with the present invention.
Figure 1A:
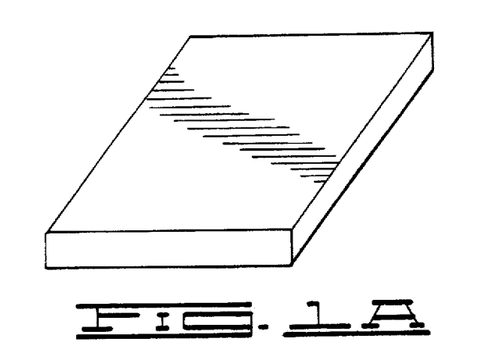
FIGS. 1A and 1B are perspective views illustrating various shapes of sausage products formed in accordance with the present invention.
Figure 1B:
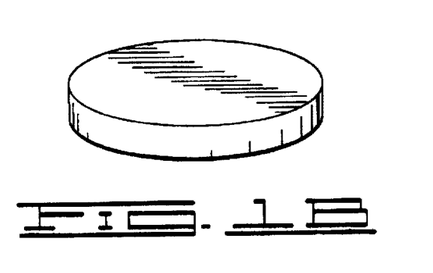

Once the meat is admixed with the encapsulated acidulant and any other ingredients employed to form a sausage admixture, the sausage admixture is formed into at least one shaped sausage product, preferably a plurality of shaped sausage products (e.g., a plurality of nuggets). Each shaped sausage product formed must have a thickness and overall shape that allows sufficient heat exchange and moisture transfer in the subsequent heating step. It has been found that sufficient heat exchange and moisture transfer in the subsequent heating step is achieved if each sausage product formed has at least one cross-sectional dimension (e.g., length, width, height, diameter) no greater than 1.0 inch. Each shaped sausage product formed preferably has at least one cross-sectional dimension no greater than 0.5 (½) inch, more preferably at least one cross-sectional dimension in the range of from about 0.125 (⅛) inch to about 0.375 (⅜) inch. Most preferably, each shaped sausage product formed has at least one cross-sectional dimension that is about 0.3125 inch (5/16 inch). For example, the sausage admixture can be formed into a plurality of rectangular sausage patties each two inches wide, two inches long and up to 0.3125 inch thick. Such a sausage patty is illustrated by FIG. 1A.

In one embodiment, the sausage admixture is formed into a plurality of sausage products, each having at least two cross-sectional dimensions no greater than 1.0 inch, preferably no greater than 0.5 inch. In this embodiment, at least two cross-sectional dimensions of each product formed are more preferably in the range of from about 0.125 inch to about 0.375 inch, most preferably about 0.3125 inch. An example of a shaped sausage product having at least two cross-sectional dimensions that are about 0.3125 inch is illustrated in FIG. 1. FIG. 1 is an enlarged view (double scale) illustrating a sausage product in the shape of a strip having a length of about 1.625 inches, a width of about 0.3125 inch and a height of about 0.3125 inch.

Figure 2:
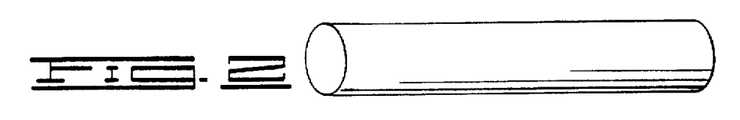
FIG. 2 is an enlarged perspective view (double scale) illustrating the shape of another sausage product formed in accordance with the present invention.
Figure 4:
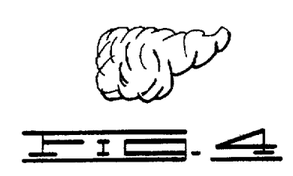
Figure 5:
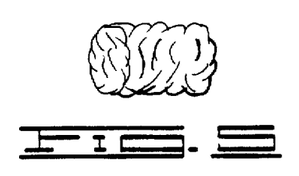

In another embodiment, the sausage admixture is formed (e.g., extruded) into one or more elongated cylindrical links each having a cross-sectional diameter no greater than 1.0 inch, preferably no greater than 0.5 inch, more preferably in the range of from about 0.125 inch to about 0.375 inch. An example of such a shaped sausage product (having a most preferred cross-sectional diameter of about 0.3125 inch) is illustrated by FIG. 2. Additional elongated cylindrical shaped products are illustrated by FIGS. 4 and 5.

Figure 3:
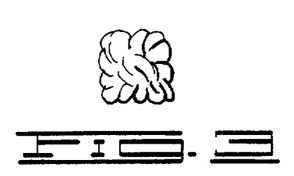
FIGS. 3–8 are enlarged perspective views (each double scale) illustrating the shapes of various additional sausage products formed in accordance with the present invention.
Figure 3A:
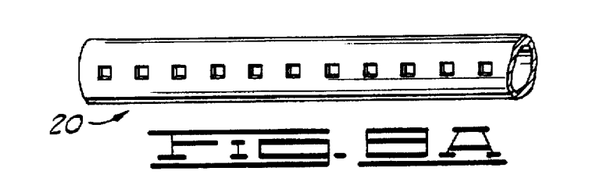
Figure 3B:
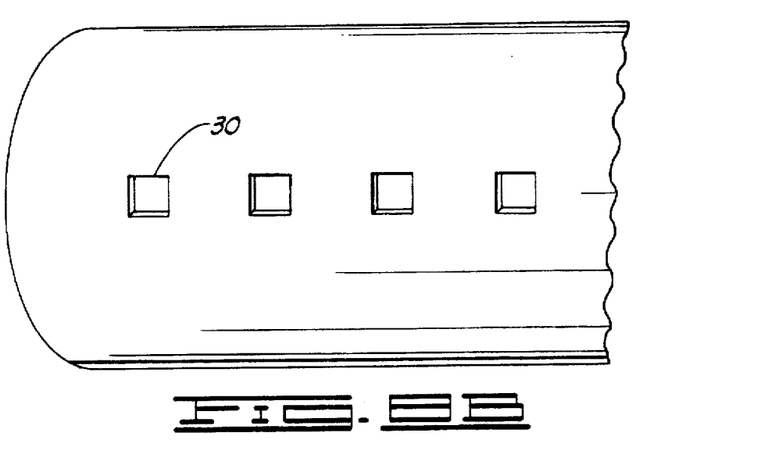
Figure 3C:
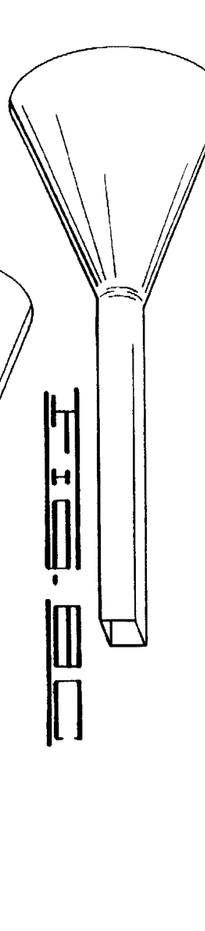
Figure 3D:
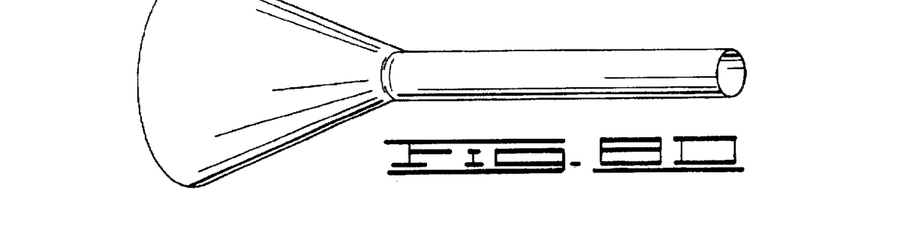
Figure 6:
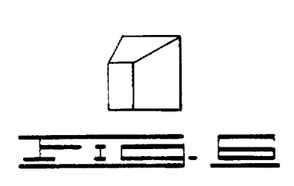
Figure 7:
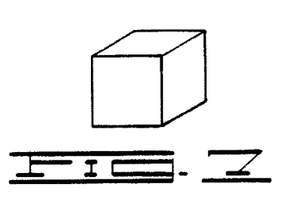

In yet another embodiment, the sausage admixture is formed (e.g., diced or extruded and cut) into a plurality of shaped sausage products wherein each product has no cross-sectional dimensions greater than about 1.0 inch, preferably no cross-sectional dimensions greater than 0.5 inch, more preferably no cross-sectional dimensions greater than about 0.375 inch. In a most preferred embodiment, the sausage admixture is formed into a plurality of shaped sausage products wherein each product has no cross-sectional dimensions greater than about 0.3125 inch. Examples of shaped sausage products (nuggets) having no cross-sectional dimensions greater than about 0.3125 (5/16) inch are illustrated by FIGS. 3, 6 and 7.

As used herein and in the appended claims, a cross-sectional dimension of a shaped sausage product refers to the greatest length of the selected cross-sectional dimension. For example, FIG. 4 illustrates an odd-shaped sausage nugget having a maximum height (as oriented) of about 0.3125 (5/16) inch (the drawing is double scale). Although the height of the nugget varies somewhat depending on which point along the length and width of the nugget the height is measured, it does not exceed about 0.3125 inch. Thus, it can be said that the nugget has at least one cross-sectional dimension (in this case height) no greater than about 0.3125 inch. In other words, each of the odd-shaped nuggets illustrated by FIGS. 3, 4, 5, 6 and 8 can be oriented in such a way that they would pass through, without compression, two points spaced apart by about 0.3125 inch. Thus, each of these products has at least one cross-sectional dimension no greater than about 0.3125 inch. The nuggets illustrated by FIG. 3 has no cross-sectional dimensions greater than 0.3125 inch.

The optimal shape of the sausage product(s) to be formed from the sausage admixture depends somewhat on the type of heating apparatus used and specific conditions of the heating step. In general, the smaller the dimensions of the shaped sausage product(s) formed the greater the rate of heat penetration and moisture removal achieved in the heating step.

Figure 8:
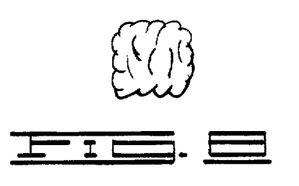

The sausage admixture can be formed into one or more shaped sausage products having the required shape by dicing, extruding, sheeting or any other suitable technique known to those skilled in the art. The nature of the process allows nuggets and other sausage products having non-conventional shapes to be formed. Preferably, the sausage admixture is formed into one or more shaped sausage products in accordance with the invention by dicing or cold extrusion, most preferably by cold extrusion. Cold extrusion is a process whereby the sausage admixture is forced through shaped nozzles or other orifices. For example, the sausage admixture can be extruded through an extrusion head having a plurality of openings extending therethrough. Depending on the shape of the openings in the head, the sausage admixture can be extruded into ribbons, strips, ropes and the like. For example, the products illustrated by FIGS. 1A, 2 and 3–8 can all be formed by extrusion. An example of a suitable extrusion head for use in connection with the present invention is illustrated by FIGS. 8A and 8B. As shown, the head 20 includes a plurality of square openings 30 extending therethrough, each opening being approximately 0.3215 inch high and 0.3125 inch wide (FIG. 8B representing actual size). As shown by FIG. 8B, the openings 30 extending through the head 20 are square and approximately 0.3125 inch thick. FIGS. 8C and 8D illustrate extrusion or stuffing horns that can be used to form the sausage admixture into one or more shaped sausage products in accordance with the invention. When the sausage admixture is formed into shaped sausage products by extrusion, the products are preferably each cut into a plurality of pieces prior to the heating step. For example, the elongated rectangularly shaped sausage product illustrated by FIG. 1A can be cut along its length into a plurality of pieces wherein each piece has no cross-sectional dimensions greater than 0.3125 inch. The product can be cut by a rotating blade positioned between the extrusion plate and the heating apparatus used to carry out the heating step. Alternatively, as long as at least one cross-sectional dimension is no greater than 1.0 inch, continuous lengths of sausage products can be cooked in the heating step. The products can be cut after the heating step if desired.

Once the sausage admixture is formed into one or more shaped sausage products, the product(s) are heated at a temperature and for a period of time sufficient to (a) melt the encapsulating material and allow the acidulant to contact the meat and lower the pH of the product(s) to a value no greater than 5.3 and (b) dehydrate the product(s) such that the moisture to protein ratio ("MPR") in the product(s) (i.e., the ratio of the weight of moisture to the weight of protein in the product(s)) is no greater than 3.7 to 1.

For sausage that contains pork, it is important to heat the product(s) at a temperature and for a period of time that is also sufficient to assure that trichinae and any harmful bacteria is destroyed in accordance with U.S.D.A. regulations. For example, for pepperoni, it is necessary to heat the product(s) at a temperature and for a period of time sufficient to raise the internal temperature of the product(s) to at least about 145° F., preferably to at least about 170° F. Such internal product temperatures are typically achieved in accordance with the inventive process even when the sausage does not contain pork. For example, at 450° F., the internal temperature of a shaped sausage product 5/16 of an inch thick generally reaches at least 170° F. in 5 minutes or less. Trichinae is destroyed in accordance with the inventive process by the curing and heating aspects of the process. U.S.D.A. prescribed treatments of pork and products containing pork are set forth in *Code of Federal Regulations*, Section 318.10 (May, 1985), which is incorporated by reference herein.

Regardless of the type of product being produced and the particular requirements therefor, the heating step is carried out for a period of time no greater than about 1 hour and in a heating apparatus operating at a dry bulb temperature in the range of from about 90° F. to about 500° F. for at least about 70% (preferably 100%) of the period of time that the heating step is carried out. The exact time of the heating step and the exact dry bulb temperature(s) employed within the above limits will vary depending on many process parameters and factors including the type of product(s) being produced and the particular requirements therefor, the initial amount of moisture in the product(s), the melting temperature of the encapsulating material, whether or not a dry protein source was added to the sausage admixture, the shape of the product(s) being heated, and the type of heating apparatus being used. Of course, the time required of the heating step decreases as the temperature employed in the step increases. Generally, the heating step is carried out for at least about 30 seconds. The product(s) are generally scorched if a dry bulb temperature above about 500° F. is employed. The advantages of the inventive process are not achieved at a dry bulb temperature below about 90° F.

The heating step is preferably carried out for a period of time no greater than about 45 minutes. Although a longer time can be used, the economic advantages of the invention are most realized if the heating step is limited to 45 minutes or less. When the product(s) formed each have at least one cross-sectional dimension no greater than 0.5 inch, the heating step is preferably carried out for a period of time no greater than about 10 minutes and in a heating apparatus operating at a dry bulb temperature in the range of from about 180° F. to about 450° F. for at least about 70% (preferably 100%) of the period of time that the heating step is carried out. When the product(s) formed each have one cross-sectional dimension in the range of from about 0.125 inch to about 0.375 inch, the heating step is preferably carried out for a period of time in the range of from about 2 to about 5 minutes and in a heating apparatus operating at a dry bulb temperature in the range of from about 215° F. to about 450° F. for at least about 70% (preferably 100%) of the period of time that the heating step is carried out. In a continuous process, the heating apparatus operates at the listed dry bulb temperatures for the entire period of time that the heating step is carried out. Regardless of the type of sausage being produced, the process can be carried out such that the heating step lasts only 2 to 5 minutes. The entire process can be carried out in under 5 minutes for all dry and semi-dry sausage products.

In order to accelerate the rate at which the temperature of the product(s) is raised to the desired level and hence decrease the overall period of time in which the heating step is carried out, the wet bulb temperature in the heating apparatus is preferably maintained at a value of at least about 150° F. for at least 25% of the first half of the period of time that the heating step is carried out. Increasing the humidity in the heating apparatus increases the rate at which the product(s) are heated. Due to the high temperatures involved in the heating step, moisture added to the heating apparatus to increase and maintain the wet bulb temperature is not absorbed by the sausage product(s). The wet bulb temperature in the heating apparatus is more preferably maintained at a value of at least about 190° F. for at least the first 40% of the time that the heating step is carried out. Once the desired product temperature is reached, maintenance of a particular wet bulb temperature can be discontinued. It is generally not necessary to maintain the wet bulb temperature beyond the first half of the period of time that the heating step is carried out. The wet bulb temperature is preferably maintained in the heating apparatus by adding steam to the apparatus. Many types of ovens have dry heat and steam heat capabilities. For example, the desired wet bulb temperature (as well as the desired dry bulb temperature) can merely be dialed in with a conventional steam and gas fired oven. For example, in a preferred embodiment, the product (s) travel through a steam and gas fired oven on a perforated belt. The oven has four approximately equal size chambers. The oven operates at the selected dry bulb temperature (e.g., 450° F.) in all four chambers so that the product(s) are subjected to the selected dry bulb temperature for the entire period of time that the heating step is carried out. The oven is set to maintain the selected wet bulb temperature (e.g., 190° F.) in only the first two chambers so that the product(s) are subjected to the selected wet bulb temperature for the first half of the period of time that the heating step is carried out.

The required finished product MPR for various types of dry and semi-dry sausage products is shown below.

| | |
|---|---|
| Beef summer sausage | 3.1:1 |
| Pepperoni | 1.6:1 |
| Jerky | 0.75:1 |
| Dry sausage | 1.9:1 |
| Thuringer | 3.7:1 |

| -continued | |
|---|---|
| Dry salami | 1.9:1 |
| Genoa salami | 2.3:1 |
| Farmer summer sausage | 1.9:1 |

Thus, the shaped sausage product(s) are completed in a single heating step. The pH of the product(s) is lowered to the required finished product pH value, a value no greater than 5.3 (typically in the range of from 5.0 to 4.1 depending on the type of product being produced). Lowering the pH of the product(s) to a value no greater than 5.3 prevents further bacterial growth and otherwise makes the product(s) biologically stable, achieves the desired acidic flavor and sets the protein in the meat in order to give the product(s) a firm texture. Of primary significance is the fact that sufficient moisture is flashed off or otherwise removed from the product(s) to achieve the required finished product MPR in a relatively short period of time. The fact that the heating step can be accomplished in only a few minutes is a primary advantage of the invention. A variety of process parameters (e.g., the dimensions of the product(s)) make such a short heating time possible. The internal temperature of the product(s) is raised to whatever level is necessary to kill any trichinae and other dangerous food-spoiling microorganisms present in the product(s).

The heating step of the inventive process can be carried out using many types of heating apparatuses. Generally, the quicker the temperature of the sausage product(s) can be raised the shorter the time of the heating step. Examples of heating devices that can be used include microwave heating devices, OHMIC heating devices, radio frequency (RF) heating devices, hot belt heating devices, infrared heating devices, halogen light heating devices, and conventional heating devices (e.g., those involving hot air, steam, oil and/or any other conventional heat transfer medium.) Preferably, the heating step is carried out using an all purpose oven, i.e., a conventional oven having dry bulb temperature and wet bulb temperature control. An example of such a heating device is a steam and gas fired oven. In one embodiment, the heating step is carried out using a combined steam and gas fired oven and microwave oven. The microwave energy provided by the microwave aspect of the oven speeds up the heating of the interior of the product(s).

For example, the inventive process can be used to mass produce beef summer sausage, a semi-dry sausage product. Meat consisting of raw beef is admixed with an encapsulated acidulant, spices and curing agents to form a sausage admixture. The encapsulated acidulant is citric acid encapsulated by a partially hydrogenated soybean oil. The melting point of the encapsulating material is about 154° F. The encapsulated acidulant is added to the sausage admixture in an amount sufficient to impart approximately 1.0% by weight citric acid, based on the meat, to the meat when the encapsulating material melts. This amount of citric acid is sufficient to lower the pH of the meat to a value of approximately 4.8. The meat, which is first ground, is admixed with the encapsulated acidulant and other ingredients in an conventional meat blender.

The sausage admixture can then be formed into a square patty approximately two inches long, three inches wide and 0.5 inch thick. As another example, the sausage admixture can be formed into a round patty approximately two inches in diameter and 0.5 inch thick. The patty can then be heated at a temperature and for a period of time sufficient to melt the hydrogenated soybean oil and allow the citric acid to contact the meat and lower the pH of the patty to a value of about 4.8 and dehydrate the patty such that the moisture to protein ratio in the patty is about 3.1:1. The heating step can be carried out for a period of time of about 5 minutes in a conventional hot air oven operating at a dry bulb temperature of about 450° F. for the entire period of time that the heating step is carried out. The resulting beef summer sausage product will have a finished product pH of about 4.8 and a finished product moisture to protein ratio of about 3.1:1.

Figure 9:
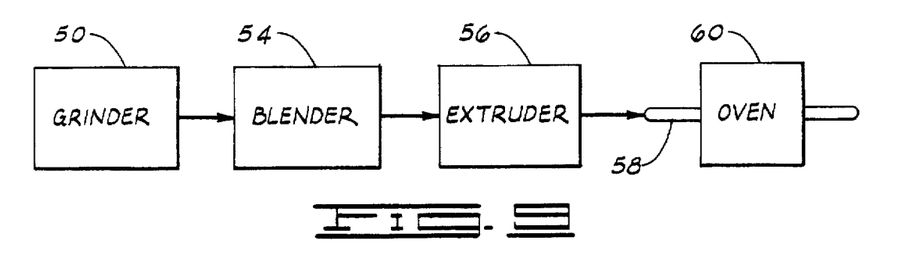
FIG. 9 is a schematic diagram generally illustrating a preferred embodiment of the process and associated apparatus of the present invention.

In a preferred embodiment, the inventive process is employed on a continuous basis to mass produce dry or semi-dry sausage products. A schematic illustration of a continuous process in accordance with the present invention is illustrated by FIG. 9. Meat trimmings are first ground in a grinder 50. The ground meat is then blended with an encapsulated acidulant and other ingredients (e.g., spices, curing agents, sources of protein) in a blender 54 and transferred to a cold extruder 56. The extruder 56 extrudes the blended sausage admixture into a plurality of sausage products and places the products upon a moving perforated or woven belt 58. If desired, the products can be cut into pieces as they exit the extruder and fall into the belt 58. The products are then carried by the belt 58 through a heating apparatus 60 wherein production of the products is completed. The heating step is carried out for a period of time no greater than about one hour. For example, if the selected heating time is four minutes, the belt is driven a speed whereby the products are present in the oven for four minutes. The oven has four approximately equal size chambers. The selected dry bulb temperature is preferably maintained in all four chambers so that the products are subjected to the dry bulb temperature for the entire period of time that the heating step is carried out. The selected wet bulb temperature is preferably maintained in only the first two chambers so that the products are subjected to the wet bulb temperature for the first half of the period of time that the heating step is carried out. For example, when the wet bulb temperature in the first chamber drops below the selected wet bulb temperature, the oven automatically adds steam to the chamber.

In order to further illustrate the inventive process, the following examples are given. Although the examples are presented to illustrated certain specific embodiments of the invention, they are not to be construed to restrict the scope and spirit of the invention.

EXAMPLE I

A sample of dry sausage (pepperoni) was produced in accordance with the inventive process. The sample was then visually inspected, tasted and tested for compliance with U.S.D.A. regulations.

First, meat was admixed with an encapsulated acidulant, spices, seasonings, a curing agent and a protein source to form a sausage admixture. The meat consisted of a mix of raw beef and raw pork with the beef present in an amount of about 10% by weight of the meat mix and the pork present in an amount of about 90% by weight of the meat mix. The beef and pork were ground together in a conventional meat grinder prior to being admixed with the other ingredients. The total fat content in the meat was about 35% by weight based on the weight of the meat (meat referring to the meat mix).

The encapsulated acidulant was citric acid encapsulated with a partially-hydrogenated soybean oil sold under the trade designation "DURKOTE® CITRIC ACID 150-85" by Van Den Bergh, Food Ingredients Group. The melting point of the encapsulating material was in the range of from 150°–158° F. The encapsulated acidulant was employed in the sausage admixture in an amount of about 1.1% by weight based on the weight of the meat. This amount of encapsulated acidulant was sufficient to impart approximately 1.0% by weight citric acid, based on the weight of the meat, to the meat, which was sufficient to lower the pH of the meat to a value of approximately 4.8.

The curing agent used was sodium nitrite and was employed in the sausage admixture in a total amount of 156 parts per million parts of the meat. The spices and seasonings used were paprika, fennel, salt and peppers and were employed in the sausage admixture in an amount of about 1.2% by weight based on the weight of the meat. The protein source was beef stock and was employed in the sausage admixture in an amount of about 3.0% by weight based on the weight of the meat.

The meat mix was admixed with the encapsulated acidulant, spices, seasonings, curing agent and protein source in a conventional meat blender for approximately 3 minutes.

Next, the sausage admixture was continuously extruded into a plurality of square strips, each strip being approximately 0.3125 inch wide and 0.3125 inch high as illustrated by FIG. 1 of the drawings. The strips were extruded by loading the sausage admixture into an extrusion chamber and using a piston to push the admixture through an extrusion head. The extrusion head included a plurality of square openings extending therethrough. Each opening was 0.3125 inch wide and 0.3125 inch high. The extrusion head is generally illustrated by FIGS. 8A and 8B of the drawings.

A rotating blade positioned adjacent to the down side of the extrusion head was used to continuously cut each strip into a plurality of pieces. Each piece had the shape of a cube approximately 0.3125 inch wide, 0.3125 inch high and 0.3125 inch long. Such a cube is generally illustrated by FIG. 7 of the drawings. The pieces fell onto a moving perforated belt as they were cut. The belt carried the pieces through a heating apparatus.

The heating apparatus through which the pepperoni pieces moved was a continuous all purpose oven (steam and gas fired) having independent dry bulb temperature and wet bulb temperature control. The oven had four approximately equal size chambers. Each piece moved through the oven and was therefore heated by the oven for approximately 4 minutes. The oven operated at a dry bulb temperature of about 450° F. in all four chambers and hence for the entire time that the pieces moved therethrough. The oven was maintained at a wet bulb temperature of about 190° F. in the first two chambers and hence for the first two minutes that each piece moved therethrough. The oven maintained the 190° F. wet bulb temperature in the first two chambers by adding steam to the chambers as needed. As each piece moved through the oven, the encapsulating material melted allowing the citric acid to contact the meat and lower the pH of the piece to approximately 4.8. The internal temperature of each piece was raised to approximately 180° F. Finally, each piece was dehydrated such that the moisture to protein ratio in the piece was no greater than 1.6:1.

A few of the pieces were analyzed upon exiting the oven. The pieces looked and tasted like conventional pepperoni, had a pH level of 4.8 and a moisture to protein ratio of 1.6:1 or less.

EXAMPLE II

An additional sample of dry sausage (pepperoni) was produced in accordance with the inventive process. The sample was then visually inspected, tasted and tested for compliance with U.S.D.A. regulations.

First, meat was admixed with an encapsulated acidulant, spices, seasonings, a curing agent and a protein source to form a sausage admixture. The meat consisted of a mix of raw beef and raw pork with the beef present in an amount of about 10% by weight of the meat mix and the pork present in an amount of about 90% by weight of the meat mix. The beef and pork were ground together in a conventional meat grinder prior to being admixed with the other ingredients. The total fat content in the meat was about 35% by weight based on the total weight of the meat (meat referring to the meat mix).

The encapsulated acidulant was citric acid encapsulated with a partially-hydrogenated soybean oil sold under the trade designation "DURKOTE® CITRIC ACID 150-85" by Van Den Bergh, Food Ingredients Group. The melting point of the encapsulating material was in the range of from 150°–158° F. The encapsulated acidulant was employed in the sausage admixture in an amount of about 1.1% by weight based on the weight of the meat. This amount of encapsulated acidulant was sufficient to impart approximately 1.0% by weight citric acid, based on the weight of the meat, to the meat, which was sufficient to lower the pH of the meat to a value of approximately 4.8.

The curing agent used was sodium nitrite and was employed in the sausage admixture in a total amount of 156 parts per million parts of the meat. The spices used were paprika, fennel, salt and peppers and were employed in the sausage admixture in an amount of about 1.2% by weight based on the weight of the meat. The protein source was beef stock and was employed in the sausage admixture in an amount of about 3.0% by weight based on the weight of the meat.

The meat mix was admixed with the encapsulated acidulant, spices, seasonings, curing agent and protein source in a conventional meat blender for approximately 3 minutes.

Next, the sausage admixture was continuously extruded into a plurality of cylindrical ropes, each strip being approximately 0.3125 inch in diameter as illustrated by FIG. 2 of the drawings. The ropes were extruded by loading the sausage admixture into an extrusion chamber and using a piston to push the admixture through an extrusion head. The extrusion head was approximately 0.3125 inch thick and included a plurality of round openings extending therethrough. Each opening was 0.3125 inch in diameter.

A rotating blade positioned adjacent to the down side of the extrusion head was used to continuously cut each rope into a plurality of pieces. Each piece had a diameter of approximately 0.3125 inch and was approximately 0.3125 inch thick. The pieces fell onto a moving perforated belt as they were cut. The belt carried the pieces through a heating apparatus.

The heating apparatus through which the pieces moved was a continuous all purpose oven (steam and gas fired) having independent dry bulb temperature and wet bulb temperature control. The oven had four approximately equal size chambers. Each piece moved through the oven and was therefore heated by the oven for approximately 5 minutes. The oven operated in a dry bulb temperature of about 450° F. in all four chambers and hence for the entire time that the pieces moved therethrough. The oven was maintained at a wet bulb temperature of about 190° F. in the first two chambers and hence for the first two minutes that each piece moved therethrough. The oven maintained the 190° F. wet bulb temperature in the first two chambers by adding steam to the chambers as needed. As each piece moved through the oven, the encapsulating material melted allowing the citric acid to contact the meat and lower the pH of the product to approximately 4.8. The internal temperature of each piece was raised to approximately 190° F. Finally, each piece was dehydrated such that the moisture to protein ratio in the piece was no greater than 1.6:1.

A few of the pieces were analyzed upon exiting the oven. The pieces looked and tasted like conventional pepperoni, had a pH level of 4.8 and a moisture to protein ratio of 1.6:1 or less.

Thus, the present invention is well adapted to carry out the objects and attain the ends and advantages mentioned as well as those which are inherent therein. The preceding examples can be repeated with similar success by substituting the generically or specifically described components and/or operating conditions of this invention for those used in the examples.

Furthermore, although certain preferred embodiments of the invention have been described for illustrative purposes, it will be appreciated that various modifications and innovations of the process recited herein may be effected without departure from the basic principals which underlie the invention. Changes of this type are therefore deemed to lie within the spirit and scope of the invention except as may be necessarily limited by the appended claims and reasonable equivalents thereof.

What is claimed is:

1. A process for rapidly producing dry and semi-dry sausage products without extended fermenting and drying steps comprising:

admixing meat with an acidulant to form a sausage admixture, said acidulant being encapsulated by an encapsulating material having a melting temperature of at least about 90° F. such that said acidulant is prevented from substantially contacting said meat until said encapsulating material is heated to at least about 90° F. and melts, said acidulant further being employed in an amount and having a strength sufficient to lower the pH of said sausage admixture to a value no greater than 5.3 when said encapsulating material melts;

forming said sausage admixture into at least one shaped sausage product having at least one cross-sectional dimension no greater than 1.0 inch; and after forming said sausage admixture into at least one shaped sausage product having at least one cross-sectional dimension no greater than 1.0 inch, heating said shaped sausage product at a temperature and for a period of time sufficient to (a) melt said encapsulating material and allow said acidulant to contact said meat and lower the pH of said product to a value no greater than 5.3 and (b) dehydrate said product such that the moisture to protein ratio in said product is no greater than 3.7 to 1, said heating step being carried out for a period of time no greater than about 1 hour and in a heating apparatus operating at a dry bulb temperature in the range of from about 90° F. to about 500° F. for at least about 70% of the period of time that said heating step is carried out.

2. The process of claim 1 further comprising maintaining a wet bulb temperature in said heating apparatus of at least about 150° F. for at least 25% of the first half of the period of time that said heating step is carried out.

3. The process of claim 1 further comprising maintaining a wet bulb temperature in said heating apparatus of at least about 190° F. for at least the first 40% of the time that said heating step is carried out.

4. The process of claim 1 wherein said heating step is carried out for a period of time no greater than about 45 minutes.

5. The process of claim 1 wherein said sausage admixture is formed into at least one shaped sausage product having at least one cross-sectional dimension no greater than 0.5 inch.

6. The process of claim 5 wherein said heating step is carried out for a period of time no greater than about 10 minutes and in a heating apparatus operating at a dry bulb temperature in the range of from about 180° F. to about 450° F. for at least about 70% of the period of time that said heating step is carried out.

7. The process of claim 1 wherein said sausage admixture is formed into at least one shaped sausage product having at least one cross-sectional dimension in the range of from about 0.125 inch to about 0.375 inch.

8. The process of claim 7 wherein said heating step is carried out for a period of time in the range of from about 2 to about 5 minutes and in a heating apparatus operating at a dry bulb temperature in the range of from about 215° F. to about 450° F. for at least about 70% of the period of time that said heating step is carried out.

9. The process of claim 1 wherein said acidulant is selected from the group consisting of citric acid, lactic acid, acetic acid, sorbic acid, tartaric acid, isoascorbic acid, adipic acid and mixtures thereof.

10. The process of claim 9 wherein said acidulant is selected from the group consisting of citric acid, lactic acid, acetic acid and mixtures thereof.

11. The process of claim 10 wherein said acidulant is citric acid.

12. The process of claim 1 wherein said encapsulating material is selected from the group consisting of hydrogenated vegetable oil, edible petroleum wax, tallow, edible vegetable wax and hydrogenated lard.

13. The process of claim 12 wherein said encapsulating material is a hydrogenated vegetable oil.

14. The process of claim 1 wherein said acidulant is selected from the group consisting of citric acid, lactic acid, acetic acid and mixtures thereof and is employed in said sausage admixture in an amount in the range of from about 0.3% to about 3.0% by weight based on the weight of said meat.

15. The process of claim 1 wherein said acidulant comprises at least about 85% of the total weight of said encapsulated acidulant and said encapsulated acidulant is employed in said sausage admixture in an amount in the range of from about 0.35% to about 3.5% by weight based on the weight of said meat.

16. The process of claim 15 wherein said encapsulated acidulant consists essentially of citric acid encapsulated by a hydrogenated vegetable oil.

17. The process of claim 1 wherein said sausage admixture is formed into at least one shaped sausage product having at least one cross-sectional dimension no greater than 1.0 inch by extruding said sausage admixture through an extrusion head having at least one opening extending therethrough.

18. The process of claim 17 wherein said extrusion head has a plurality of square openings extending therethrough.

19. The process of claim 17 further comprising, after extruding said sausage admixture through said extrusion head and before carrying out said heating step, cutting said shaped sausage product into more than one piece.

20. The process of claim 19 wherein each of said pieces formed by said cutting step has no cross-sectional dimensions greater than 1.0 inch.

21. The process of claim 1 wherein a dry protein source is admixed with said meat prior to forming said sausage admixture into at least one shaped sausage product having at least one cross-sectional dimension no greater than 1.0 inch.

22. The process of claim 21 wherein said protein source is selected from the group consisting of milk protein, soy protein, corn protein, wheat protein, beef protein, pork protein, sunflower protein and mixtures thereof.

23. The process of claim 1 wherein at least one spice and at least one curing agent are admixed with said meat at the time said encapsulated acidulant is admixed therewith.

24. The process of claim 1 wherein said heating apparatus used in said heating step is a steam and gas fired oven.

25. The process of claim 1 wherein said heating apparatus used in said heating step is a combined steam and gas fired oven and microwave oven.

26. The process of claim 1 wherein said heating step carried out at a temperature and for a period of time sufficient to dehydrate said product such that the moisture to protein ratio in said product is no greater than 3.1 to 1.

27. The process of claim 1 wherein said heating step is carried out at a temperature and for a period of time sufficient to dehydrate said product such that the moisture to protein ratio in said product is no greater than 1.9 to 1.

28. A continuous process for rapidly producing dry and semi-dry sausage products without extended fermenting and drying steps comprising:

admixing meat with an acidulant to form a sausage admixture, said acidulant being encapsulated by an encapsulating material having a melting temperature of at least about 90° F. such that said acidulant is prevented from substantially contacting said meat until said encapsulating material is heated to at least about 90° F. and melts, said acidulant further being employed in an amount and having a strength sufficient to lower the pH of said sausage admixture to a value no greater than 5.3 when said encapsulating material melts;

forming said sausage admixture into at least one shaped sausage product having at least one cross-sectional dimension no greater than 0.5 inch; and after forming said sausage admixture into at least one shaped sausage product having at least one cross-sectional dimension no greater than 0.5 inch, heating said shaped sausage product at a temperature and for a period of time sufficient to (a) melt said encapsulating material and allow said acidulant to contact said meat and lower the pH of said product to a value no greater than 5.3 and (b) dehydrate said product such that the moisture to protein ratio in said product is no greater than 3.7 to 1, said heating step being carried out for a period of time no greater than about 10 minutes and in a heating apparatus operating at a dry bulb temperature in the range of from about 180° F. to about 450° F. for the entire period of time that said heating step is carried out and a wet bulb temperature of at least about 190° F. for at least the first 40% of the period of time that said heating step is carried out.

29. The process of claim 28 wherein said wet bulb temperature is regulated by adding steam to said heating apparatus.

30. The process of claim 28 wherein said sausage admixture is formed into at least one shaped sausage product having at least one cross-sectional dimension in the range of from about 0.125 inch to about 0.375 inch.

31. The process of claim 30 wherein said heating step is carried out for a period of time in the range of from about 2 to about 5 minutes and in a heating apparatus operating at a dry bulb temperature in the range of from about 215° F. to about 450° F. for the entire period time that said heating step is carried out.

32. The process of claim 28 wherein said acidulant is selected from the group consisting of citric acid, lactic acid, acetic acid, sorbic acid, tartaric acid, isoascorbic acid, adipic acid and mixtures thereof.

33. The process of claim 32 wherein said acidulant is citric acid.

34. The process of claim 28 wherein said encapsulating material is selected from the group consisting of hydrogenated vegetable oil, edible petroleum wax, tallow, edible vegetable wax and hydrogenated lard.

35. The process of claim 34 wherein said encapsulating material is a hydrogenated vegetable oil.

36. The process of claim 28 wherein said acidulant is selected from the group consisting of citric acid, lactic acid, acetic acid and mixtures thereof and is employed in said sausage admixture in an amount in the range of from about 0.3% to about 3.0% by weight based on the weight of said meat.

37. The process of claim 28 wherein said encapsulated acidulant consists essentially of citric acid encapsulated by a hydrogenated vegetable oil, said citric acid comprises about 85% of the total weight of said encapsulated acidulant and said encapsulated acidulant is employed in said sausage admixture in an amount in the range of from about 0.35% to about 3.5% by weight based on the weight of said meat.

38. The process of claim 28 wherein said sausage admixture is formed into at least one shaped sausage product having at least one cross-sectional dimension no greater than 0.5 inch by extruding said sausage admixture through an extrusion head having at least one opening extending therethrough.

39. The process of claim 38 further comprising, after extruding said sausage admixture through said extrusion head and before carrying out said heating step, cutting said shaped sausage product into more than one piece.

40. The process of claim 39 wherein each of said pieces formed by said cutting step has no cross-sectional dimensions greater than 0.5 inch.

41. The process of claim 28 wherein a dry protein source is admixed with said meat prior to forming said sausage admixture into at least one shaped sausage product having at least one cross-sectional dimension no greater than 0.5 inch.

42. The process of claim 41 wherein said protein source is selected from the group consisting of milk protein, soy protein, corn protein, wheat protein, beef protein, pork protein, sunflower protein and mixtures thereof.

43. The process of claim 28 wherein said heating step is carried out at a temperature and for a period of time sufficient to dehydrate said product such that the moisture to protein ratio in said product is no greater than 3.1 to 1.

44. The process of claim 28 wherein said heating step is carried out at a temperature and for a period of time sufficient to dehydrate said product such that the moisture to protein ratio in said product is no greater than 1.9 to 1.

45. A process for rapidly producing pepperoni without extended fermenting and drying steps comprising:

admixing meat with an acidulant to form a pepperoni admixture, said acidulant being encapsulated by an encapsulating material having a melting temperature of at least about 90° F. such that said acidulant is prevented from substantially contacting said meat until said encapsulating material is heated to at least about 90° F. and melts, said acidulant further being employed in an amount and having a strength sufficient to lower the pH of said pepperoni admixture to a value no greater than 5.3 after said encapsulating material melts;

forming said pepperoni admixture into at least one shaped pepperoni product having at least one cross-sectional dimension no greater than 0.5 inch; and after forming said pepperoni admixture into at least one shaped pepperoni product having at least one cross-sectional dimension no greater than 0.5 inch, heating said shaped pepperoni product at a temperature and for a period of time sufficient to (a) melt said encapsulating material and allow said acidulant to contact said meat and lower the pH of said product to a value no greater than 5.3, (b) raise the internal temperature of said product to at least about 145° F. and (c) dehydrate said product such that the moisture to protein ratio in said product is no greater than 1.6 to 1, said heating step being carried out for a period of time no greater than about 45 minutes and in a heating apparatus operating at a dry bulb temperature in the range of from about 90° F. to about 500° F. for at least about 70% of the period of time that said heating step is carried out.

46. The process of claim 45 further comprising maintaining a wet bulb temperature in said heating apparatus of at least about 150° F. for at least 25% of the first half of the period of time that said heating step is carried out.

47. The process of claim 45 wherein said heating step is carried out for a period of time no greater than about 10 minutes and in a heating apparatus operating at a dry bulb temperature in the range of from about 180° F. to about 450° F. for at least about 70% of the period of time that said heating step is carried out.

48. The process of claim 45 wherein said pepperoni admixture is formed into at least one shaped pepperoni product having at least one cross-sectional dimension in the range of from about 0.125 inch to about 0.375 inch.

49. The process of claim 45 wherein said heating step is carried out for a period of time in the range of from about 2 to about 5 minutes and in a heating apparatus operating at a dry bulb temperature in the range of from about 215° F. to about 450° F. for at least about 70% of the period of time that said heating step is carried out.

50. The process of claim 45 wherein said acidulant is selected from the group consisting of citric acid, lactic acid, acetic acid and mixtures thereof.

51. The process of claim 50 wherein said acidulant is citric acid.

52. The process of claim 45 wherein said encapsulating material is selected from the group consisting of hydrogenated vegetable oil, edible petroleum wax, tallow, edible vegetable wax and hydrogenated lard.

53. The process of claim 52 wherein said encapsulating material is a hydrogenated vegetable oil.

54. The process of claim 45 wherein said acidulant is selected from the group consisting of citric acid, lactic acid, acetic acid and mixtures thereof and is employed in said sausage admixture in an amount in the range of from about 0.3% to about 3.0% by weight based on the weight of said meat.

55. The process of claim 45 wherein said acidulant comprises at least about 85% of the total weight of said encapsulated acidulant and said encapsulated acidulant is employed in said sausage admixture in an amount in the range of from about 0.35% to about 3.5% by weight based on the weight of said meat.

56. The process of claim 45 wherein said pepperoni admixture is formed into at least one shaped pepperoni product having at least one cross-sectional dimension no greater than 0.5 inch by extruding said admixture through an extrusion head having at least one opening extending therethrough.

57. The process of claim 56 further comprising after extruding said pepperoni admixture through said extrusion head and before carrying out said heating step, cutting said shaped pepperoni product into a plurality of pieces.

58. The process of claim 57 wherein each of said pieces formed by said cutting step has no dimensions greater than 0.5 inch.

59. The process of claim 45 wherein a dry protein source is admixed with said meat prior to forming said pepperoni admixture into at least one shaped sausage product having at least one cross-sectional dimension no greater than 0.5 inch.

60. The process of claim 59 wherein said protein source is selected from the group consisting of milk protein, soy protein, corn protein, wheat protein, beef protein, pork protein, sunflower protein and mixtures thereof.

61. The process of claim 45 wherein at least one spice selected from the group consisting of fennel, red pepper and oregano and at least one curing agent selected from the group consisting of sodium nitrite, potassium nitrite, potassium nitrate and sodium nitrate are admixed with said meat at the time said encapsulated acidulant is admixed with said meat.

62. The process of claim 45 wherein said meat consists of at least about 90% by weight, based on the total weight of the meat, of finely divided raw meat selected from pork, beef, poultry and mixtures thereof, and has a total fat content no greater than about 58% by weight based on the total weight of the meat.

* * * * *